Oct. 20, 1964 R. M. DE LOOF ETAL 3,153,516

TAPE HANDLING MECHANISM

Filed Jan. 10, 1962 6 Sheets-Sheet 1

INVENTORS.
RICHARD M. DE LOOF
LEON M. COOPER

BY Geoffrey Knight
ATTORNEY.

Oct. 20, 1964 R. M. DE LOOF ET AL 3,153,516

TAPE HANDLING MECHANISM

Filed Jan. 10, 1962 6 Sheets-Sheet 3

Oct. 20, 1964 R. M. DE LOOF ET AL 3,153,516

TAPE HANDLING MECHANISM

Filed Jan. 10, 1962 6 Sheets-Sheet 5

United States Patent Office 3,153,516
Patented Oct. 20, 1964

3,153,516
TAPE HANDLING MECHANISM
Richard M. De Loof and Leon M. Cooper, Lexington, Ky., assignors to International Business Machines Corporation, New York, N.Y., a corporation of New York
Filed Jan. 10, 1962, Ser. No. 165,387
8 Claims. (Cl. 242—55.13)

This invention relates to a device for threading a tape through a plurality of stations, such as in paper tape devices, photographic apparatus, and data recording and reading devices.

Automatic tape threading devices have long been known in the art. Most of these devices employ one of two types of leaders. In one type, a separate leader is spliced to a tape, the same leader being used for a plurality of tapes, while in the other the leader is integral with each tape to be threaded.

The prior art teaches the manual insertion of a leader into the first stations of an automatic threading device. In most instances the leader is then automatically guided between cooperative rollers which draw the leader and the tape into the stations of the tape handling machine. Thus, there is necessitated the threading of the leader through the handling device before the tape itself can be threaded.

A serious drawback of present tape handling devices lies in the fact that the tape is exposed to atmospheric conditions and contamination by manual handling. Even in devices in which tapes are retained in cartridges, the tape is required to be manually handled during the loading of the tape into the device.

Some of the present devices employ two magazines, one containing a load reel and the other containing a take-up reel. There are several disadvantages to this type of arrangement. Aside from the fact that two magazines are required, since neither end of the tape is free, complicated mechanical devices are required to accomplish a threading operation. Too, caution must be exercised to prevent damage to that portion of the tape located between the two reels.

A disadvantage present in many of the devices is that the tape tends to "festoon" which leads to tape breakage, multilation and, many times, chatter or slippage of the tape. The prior art has suggested complicated arrangements of counterweights, weighted pulleys and electromagnetic tensioning means, all employed during operations upon the tape itself, to overcome this problem. None of the present devices, however, teaches a means whereby "festooning" during the threading operation itself may be surmounted.

Another shortcoming of the existing art is that separate control means are required for threading operations, winding operations and rewinding operations.

With the advent of higher tape transport speeds, the time required to supply a tape to a transport unit becomes an even more important consideration if maximum utility of the system is to be realized. In present day tape handling equipment, charges for the use thereof are calculated in terms of minutes-of-use. Thus, the desire to minimize or eliminate all unnecessary time consuming operations has become of paramount importance. These conditions indicate the desirability of a system whereby the tape is almost instantly available for handling as soon as it is loaded on a spindle of a tape transport.

It is, therefore, a primary object of this invention to introduce a convenient and rapid method of threading a tape into and through feed and guide areas of a tape handling mechanism.

It is also an object of this invention to make possible the threading of a tape through a desired area without any personal contact with the tape.

Yet another object is to eliminate both the use of an integral auxiliary leader and the necessity of a splicing operation, while threading a tape.

Another object of this invention is to provide a means whereby a tape will be held under tension during all phases of operation upon the tape, be they winding, pauses, or rewinding, preventing "festooning" thereby.

Yet another object of this invention is to maintain a leader in at taut position at the time it is coupled with a tape.

Still another object of this invention is to render the tape almost instantly available for operation thereon as soon as a cartridge is mounted on a driving spindle of a tape handling mechanism.

A still further object of this invention is to use a leader as part of a control means, thereby eliminating either a plurality of manual operations or elaborate control circuits.

In accordance with the principles of the invention, a tape is threaded through a plurality of stations by means of a single permanent leader, that is, a single leader that coacts with all tapes to be threaded. Thereby the need for separate leaders, each integral with or spliced to the tape, is eliminated.

In its extended position, one end of the leader is engaged by a drive means while the central portion is threaded through guiding stations. The other end of the leader is positively positioned to be automatically coupled with the tape when the latter is mounted upon the mechanism. Thereby, upon starting the threading operation, the single permanent leader provides a means for drawing the tape into the tape handling mechanism.

Thus the use of a single independent leader, which is pre-threaded through the stations of the handling device, has obviated the time consuming operation of threading a leader through the tape handling mechanism before the tape itself can be threaded.

Prior to coupling the leader with the tape, the leader is held taut by a securing means. As soon as the coupling occurs, however, the securing means is automatically removed and a tensioning means maintains both the leader and the tape taut.

The leader is adapted to provide an indication to control means that it has completed the threading of the tape through the stations of the tape handling mechanism in order that operations upon the tape may commence.

The foregoing and other objects, features and advantages of this invention will be apparent from the following more particular description of a preferred embodiment thereof, as illustrated in the accompanying drawings.

Figures 1, 11:
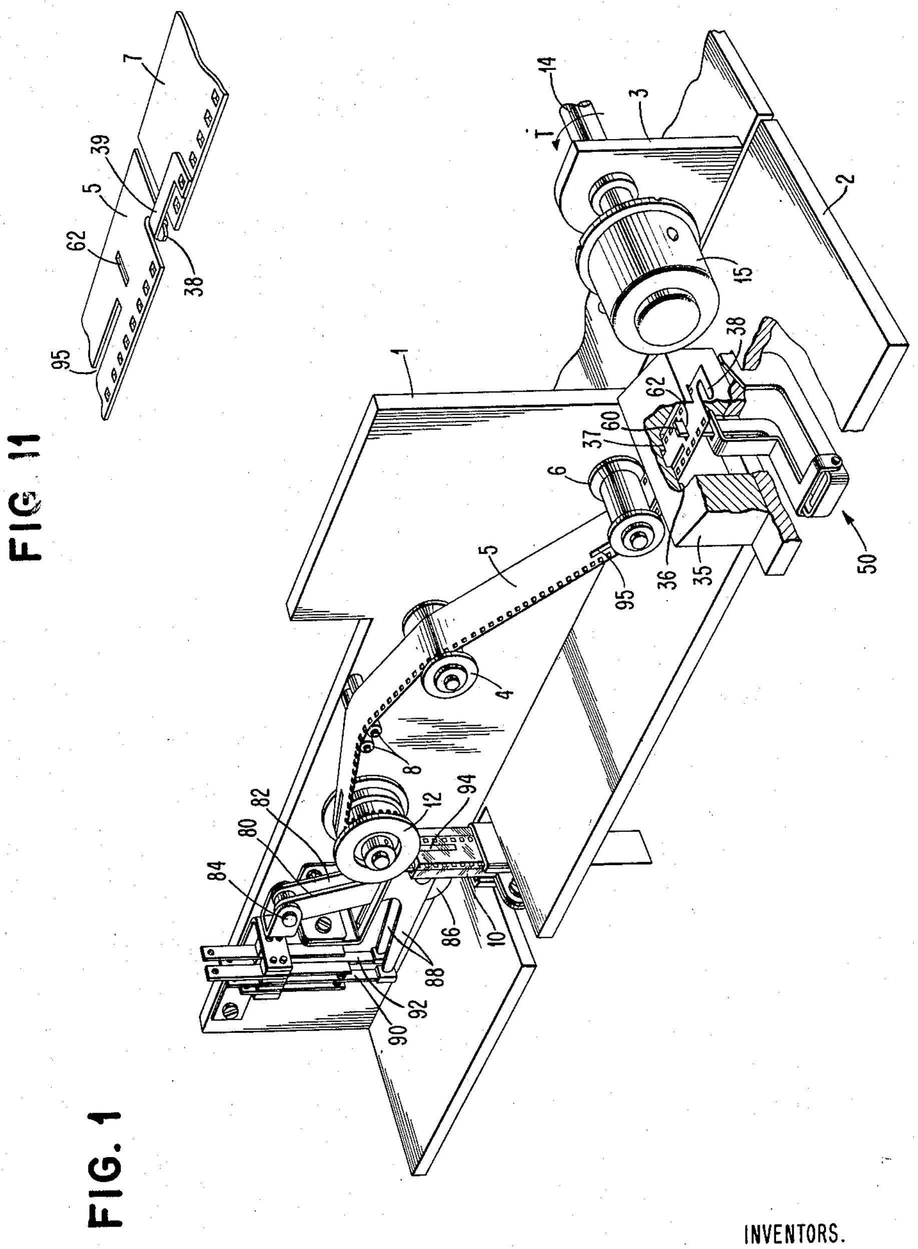
FIG. 1 is a perspective view of a magnetic tape machine embodying the invention.
FIG. 11 is a perspective view of the coupled ends of a tape and a leader used with the magnetic tape machine of FIG. 1.

Referring, now, to the drawings, an embodiment of the invention will be described as applied to a tape handling mechanism for the processing of magnetic record tape. The tape handling mechanism is mounted on a vertical panel 1 supported on a bed 2. It includes guide means, such as pulleys 4 and 6, guide fingers 8 apertaining to a magnetic recording and sensing mechanism (not shown), and a drive sprocket 12 representing a forward drive station for the magnetic tape. Below the sprocket 12 is a vertical channel member 10 through which the tape passes downwardly into a bin (not shown).

At the right end of the bed 2 is a shaft 14 rotatably mounted in a vertical panel 3 and having a hub 15 on which a reel holding the tape to be handled by the mechanism is to be mounted.

Figure 2:
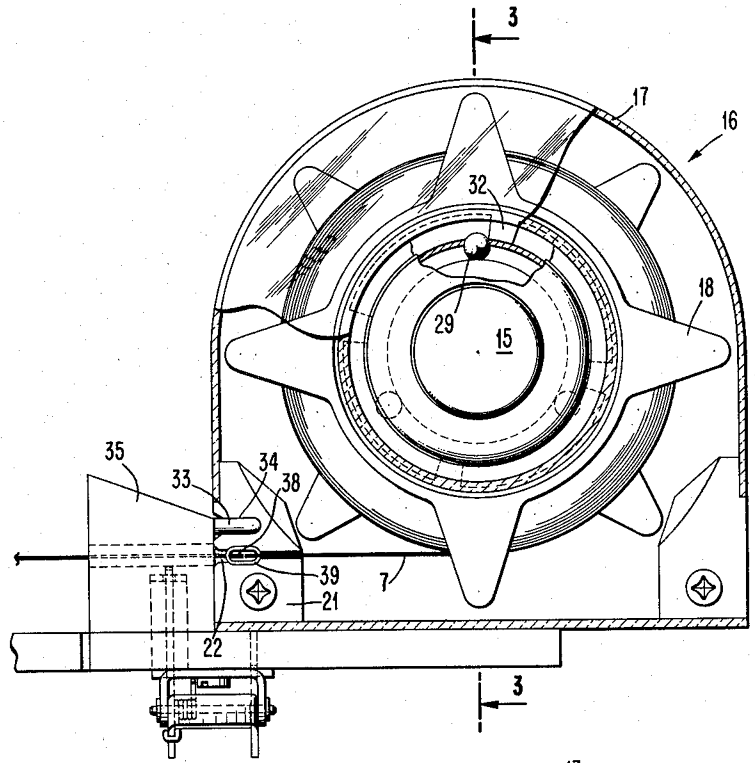
FIG. 2 is a side elevation view, partly cut away, of a magnetic tape cartridge mounted on the magnetic tape machine of FIG. 1.

The tape reels are contained in cartridges, such as catridge 16 in FIG. 2. The cartridge comprises a casing 17 within which a reel 18 (FIG. 3) is rotatably mounted by flanges 19 of the reel journaled upon inturned flanges 20 of the casing 17. Tape 7 is coiled upon the reel 18.

At the lower left corner of the cartridge casing 17 as seen in FIG. 2, is a block 21 which is slotted at 22 to provide an opening through which the tape is to be drawn out of the cartridge casing and also to establish a retaining socket to hold the free end of the tape in a definite position when the tape is reeled up.

The hub 15 (FIGS. 1, 2 and 3) comprises a block 23 fixed to the shaft 14, having a thimble 24 secured thereto by a crimped flange 25. Within the thimble 24 is a button 26 slidable upon the block 23 and normally held outwardly by a spring 27. The inner edge of the button 26 is flared at 28 to co-act with three retaining balls 29 held in holes 30 of the thimble 24. The rim of the tape reel has a circular groove 31 to be engaged by the balls to retain the reel on the hub. When the cartridge is mounted on the hub the rim of the reel presses the balls inwardly, the button 26 being cammed to the right in FIG. 3, until the groove 31 is aligned with the balls, at which time the button 26 springs back and cams the balls out to engage in the groove 31. Within the groove 31 are four lugs 32 to coact with the balls 29 to limit the relative rotary motion of the reel with respect to the hub, and to transmit the rotative force of the hub to the reel.

The block 21 is also provided with a horizontal groove 34 to receive a tongue 33 (see also FIG. 4) projecting from a stationary block 35 on the bed 2. The cartridge is thereby exactly positioned upon the bed, for reasons to be described presently.

In accordance with the invention, means are provided to engage the end of tape 7 as soon as the tape reel is mounted on the hub 15 and to thread it into stations of the tape handling mechanism 6, 4, 8, and 12. For this purpose a permanent leader 5 is provided, which is shown in FIG. 1 in its extended position, passing up through the channel 10, over the sprocket 12, and guide fingers 8, then over pulley 4 and under pulley 6 into slots 36 and 37 of block 35. The end of the leader is formed into a hook 38 which, in the extended position of the leader, projects into the slot 22 of block 21 of the cartridge, in position to be coupled to a loop 39 (FIG. 11) on the end of tape 7. The slot 22 serves to align these two elements of the coupling, so that by the simple movement of the cartridge into place on the bed, in a direction parallel to the adjacent face of block 35, the free end of the tape is surely coupled to the extended end of the leader.

Figure 8:
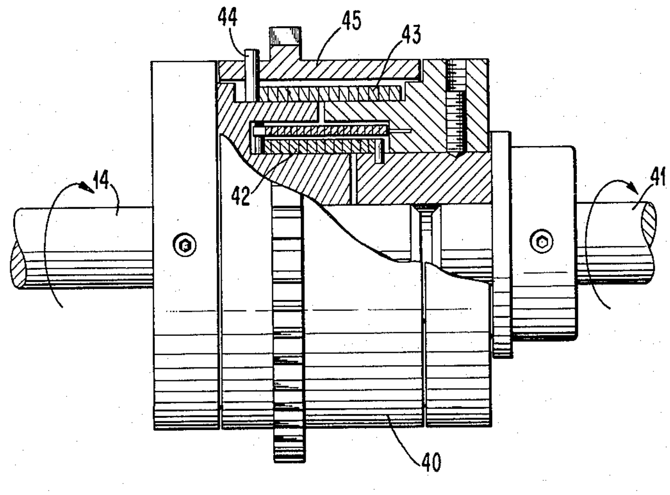
FIG. 8 is a side elevation, partially in cross section, of a two-torque spring clutch, which is used to drive the cartridge shaft of the mechanism shown in FIG. 1.

The shaft 14 has a continuous torque "T" (FIG. 1) applied to it through a clutch mechanism 40 shown in FIG. 8. This torque, being counterclockwise, tends to wind up the reel of tape, and may be either a high torque or a low torque, depending upon the state of control means of the clutch, to be described. The particular clutch shown is fully disclosed in copending U.S. patent application of W. J. Wipke, 122,823, filed July 10, 1961, and is not a part of the present invention.

Figure 9:
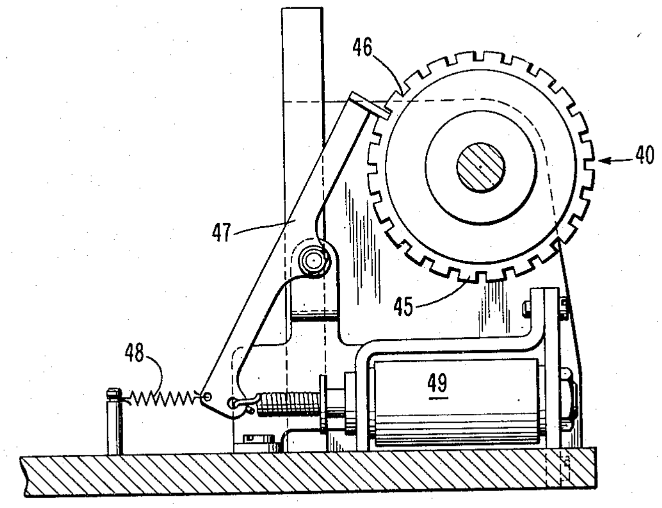
FIG. 9 is a view of a control mechanism for the two-torque spring clutch of FIG. 8.

As shown in FIG. 8, the driving power for shaft 14 is derived from a constantly driven shaft 41, through two clutch springs 42 and 43. When both clutch springs are engaged the shaft 14 is driven by a high torque. At the end of clutch spring 43 is a pin 44 which extends through a hole in a ring 45. The ring has a crown of teeth 46 coacting with a detent 47 (FIG. 9) normally held in engagement with the teeth of ring 45 by a spring 48. In this condition the ring 45 is stopped and the spring 43 is expanded, releasing it. The shaft 14 is then driven only by the low torque exerted by clutch spring 42. A solenoid 49, when energized, retracts the detent 47 from the crown of teeth 46, permitting the ring 45 to rotate which allows the clutch spring 43 to contract and engage the shaft 14 which is then driven with a high torque. Further details of the construction of the two-torque clutch will be found in the above identified co-pending application of W. J. Wipke. The purpose of providing the two-torque drive will be explained later.

One of the problems with prior art automatic threading devices has been a tendency of the tape to "festoon" in the process of threading it into the machine. The automatic tape threading mechanism described herein prevents this from occurring.

Figure 4:
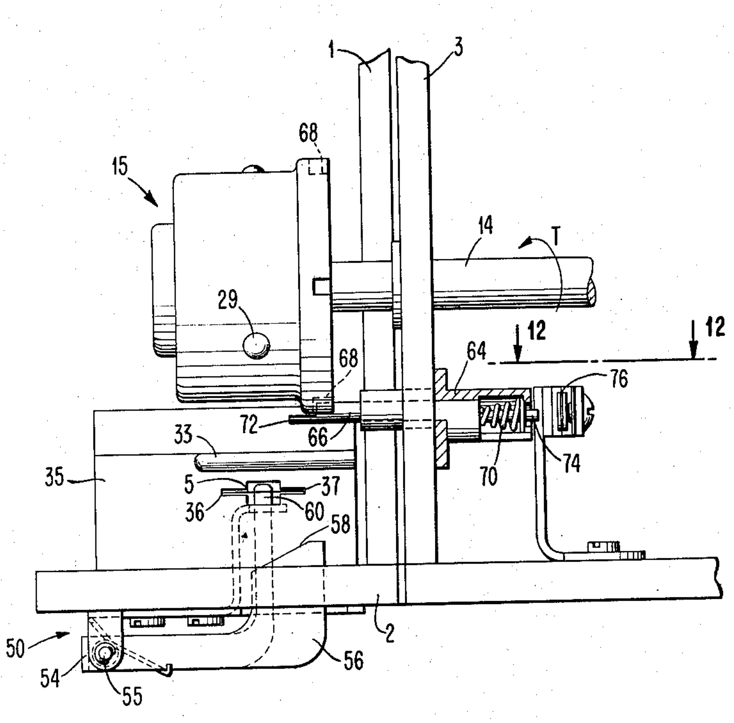
FIG. 4 is a right side view of the tape supply station assembly, partially in cross section, with the cartridge removed.

Referring now to FIGS. 1 and 4: pivotally connected to the bed 2 is a member 54 having an arm 56 extending upwardly so that a cam portion 58 on the arm 56 is engaged by the cartridge casing during mounting of the cartridge upon the hub 15. Another arm 60, also connected to the pivoted member 54, extends upwardly through an opening 62 in the leader 5, as shown in FIG. 1. The arm 60 functions to secure the leader 5 in the position shown, enabling the hook 38 to engage the loop 39 on the free end of the tape when the cartridge is mounted onto the hub (FIGS. 2 and 11). Upon mounting of the cartridge, the member 54 is rotated clockwise about pin 55 by engagement of the cartridge with the cam portion 58, thereby removing the arm 60 from the opening 62.

The continuous light torque T applied to the shaft 14 at all times by the clutch mechanism 40 tends to turn the reel in the direction to wind tape onto it, counterclockwise in FIG. 1. The opposite end of the leader is at this time being held stationary by the sprocket wheel 12. Thus the leader 5, now attached to the tape, will be held in position and not allowed to "festoon" even after the securing arm 60 is removed.

Since it is desired to rotate the hub assembly only when the cartridge is in a mounted position, a holding means is provided to prevent rotation of the hub when the cartridge is not mounted thereon.

Figure 3:
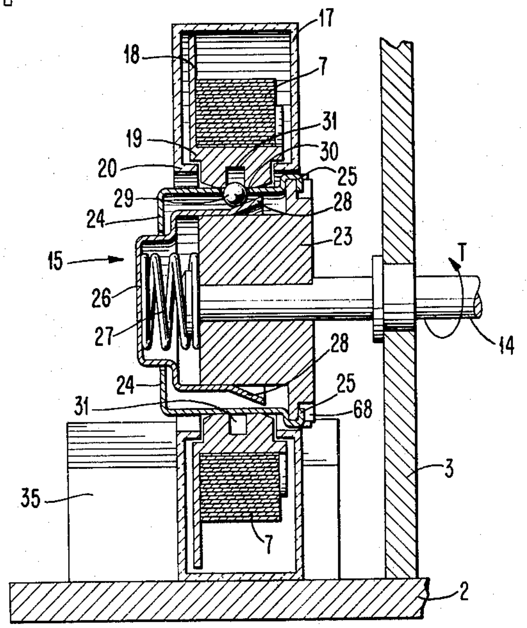
FIG. 3 is a sectional view of the tape cartridge mounted on a tape supply station assembly of FIG. 1, the section being along lines 3—3 of FIG. 2.
Figure 12:
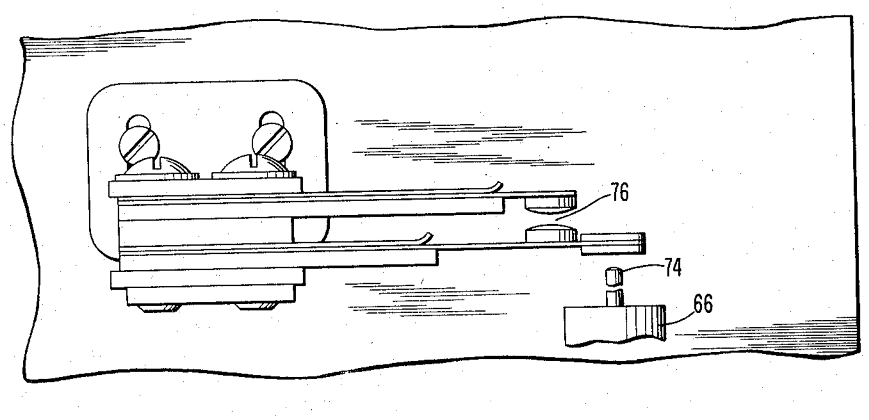
FIG. 12 is a sectional view, taken along the lines 12—12 of FIG. 4, showing a set of contacts used at the supply station assembly of FIG. 4.

Fixed to one side of the vertical panel 3 (FIG. 4) is a housing 64 slidably supporting an interposer 66, which has a shoulder extending into one or another of recesses 68 in the hub for holding the hub against rotation (see also FIG. 3). A spring 70 urges the interposer 66 towards the hub. A finger portion 72 on the interposer 66 is engaged by the cartridge casing 17, when mounting the latter, for forcing the interposer out of the recess 68. Extending at the right end of the interposer is a pin 74, which operates to close contacts 76, as shown in more detail in FIG. 12, when the cartridge is mounted upon the hub. Contacts 76 form part of a control circuit to be described later on.

The leader has integral therewith an indicating means in the form of slots. When at its several positions the leader is sensed by rollers dropping into the slots or riding on the surface of the leader or tape as the case may be. The position of the rollers determines the condition of contacts, either open or closed, which form part of a control circuit to be described later. Arranged adjacent to the member 10 of FIG. 1 are two arms 80 and 82 pivoted about pin 84 and carrying rollers 86. The rollers 86 extend through an opening in the channel member 10 to bear against the leader 5. Each of the arms 80 and 82 has a lower arm portion 88, which cooperates with a respective contact 90 or 92. So long as the roller 86 rides on the surface of the leader 5, the contacts 90 and 92 are held closed.

Formed in the leader is a slot 94, which receives the roller 86 on arm 82 for opening the contacts 92 when the leader is in the position shown in FIG. 1. At this time the tape is fully wound onto the reel. It should be noted that although the indicating means described in this embodiment are slots in the leader, this invention is not limited thereto. Equally within the scope of this invention would be, for example, raised portions upon the leader, width variations, or merely indentations therein.

The above-described elements, as they coact with the leader, function with the leader to control the operation of the tape handling mechanism. This will be more fully described later on.

Once the cartridge is mounted on the hub and the securing means 50 is disengaged, the device is ready to perform its automatic threading function. A drive means acting through sprocket wheel 12 draws the leader, and the tape attached thereto, into the stations of the tape handling mechanism. The drive means is responsive to the position of the leader and is adapted to drive, free-wheel, or lock in accordance with the position of said leader.

Figure 5:
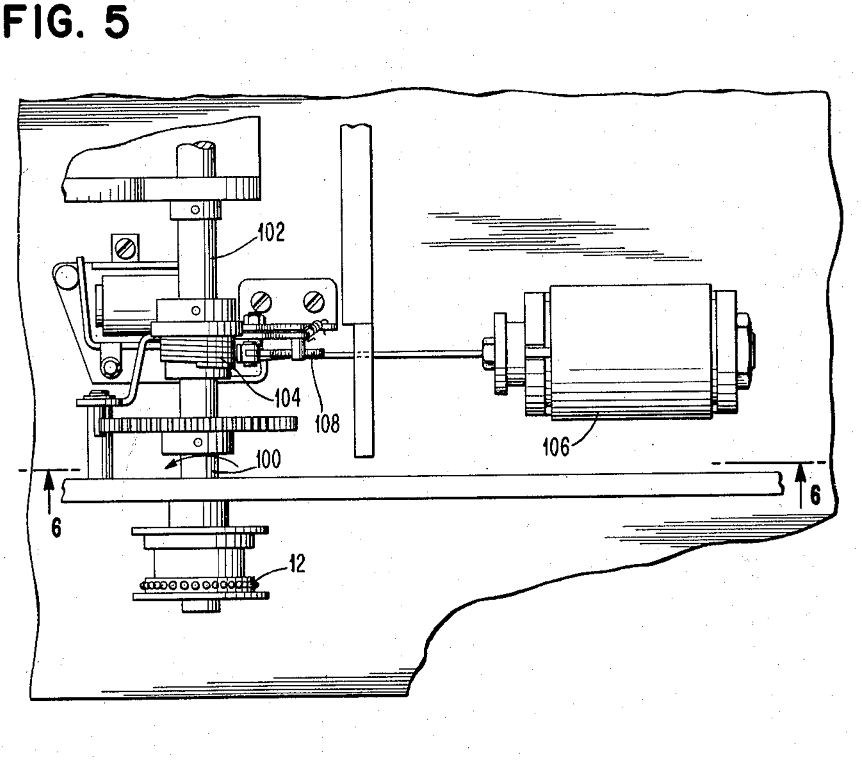
FIG. 5 is a plan view of a tape sprocket wheel drive mechanism used in the embodiment of FIG. 1.
Figure 6:
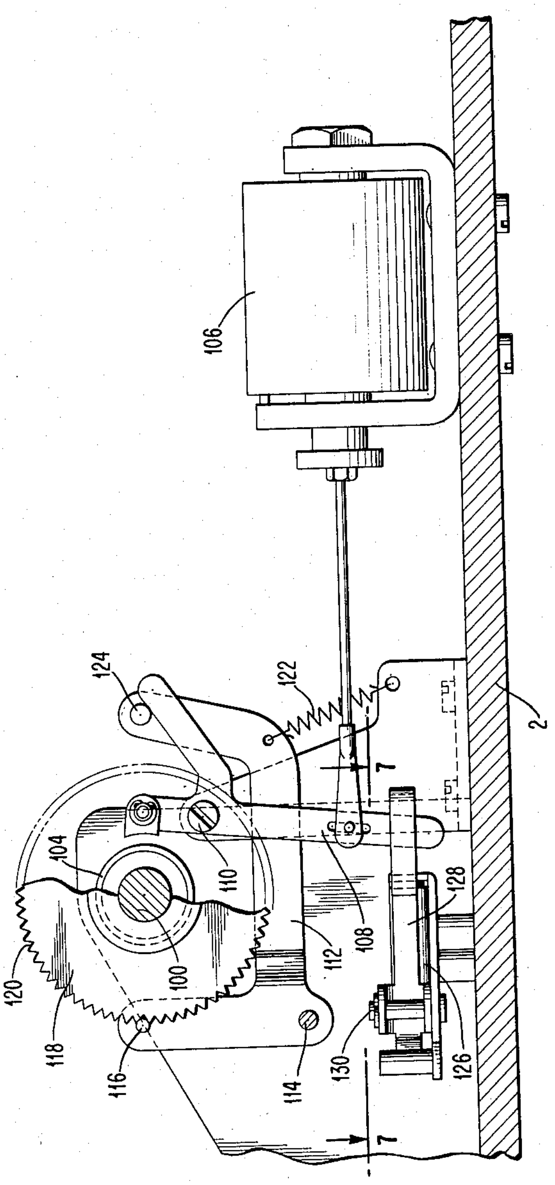
FIG. 6 is a vertical sectional view of the tape sprocket wheel drive mechanism along the lines 6—6 of FIG. 5.

The sprocket wheel 12 is mounted on a shaft 100, as shown in FIGS. 5 and 6. The shaft 100 is driven, in a counterclockwise direction, by a shaft 102 through a spring clutch 104. A solenoid 106 operates, when energized, to swing a clutch lever 108 about a pivot 110 as shown in FIG. 6. The clutch lever 108 allows engagement of the spring clutch in one position and in another position it causes disengagement of the spring clutch. A lever 112 is pivoted at 114 and carries a pin 116. Pin 116 engages a ratchet wheel 118. The ratchet wheel 118, also mounted on the shaft 100, acts to brake the shaft 100 against rotation when pin 116 is inserted in teeth 120. The lever 112 is urged, by a spring 122, to engage the pin 116 with the teeth 120 of the ratchet wheel 118. Another pin 124 is carried by the lever 112 and is acted upon by the clutch lever 108 to disengage the pin 116 from the ratchet wheel 118, when the spring clutch 104 is applied.

Figure 7:
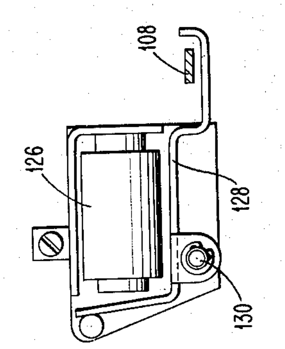
FIG. 7 is a sectional view taken along the lines 7—7 of FIG. 6 depicting the normal position of a clutch magnet mechanism.

Mounted on the bed 2 below the shaft 100 is a magnet 126 as shown in FIGS. 6 and 7. The magnet 126 is operative, when energized, to swing a hook-shaped lever 128 about a pivot 130 in a clockwise direction. The lever 128 is normally in the position of FIG. 7 and cooperates with the lower end of clutch lever 108 to limit the swing of the clutch lever by the solenoid 106. The movement of the clutch lever under these conditions is sufficient to disengage the brake pin 116 from the ratchet wheel 118, but insufficient to allow the engagement of clutch 104. When the magnet 126 is energized, the hooked lever 128 is moved out of the path of the clutch lever. Thus, energizing the solenoid 106 may cause both the release of the brake pin 116 and the application of the spring clutch 104. If the magnet 126 is not energized, the energization of the solenoid 106 merely acts to disengage the brake pin 116 from the ratchet wheel 118, thereby allowing the shaft 100 and the ratchet wheel attached thereto to free-wheel.

A normal cycle of operation for loading and unloading a tape is as follows:

Prior to the mounting of the cartridge on the hub, the interposer 66 (FIG. 4) engages a recess 68 in the hub and prevents the hub from being rotated by the constant low torque T applied to the shaft 14. When the reel is mounted on the hub, the shoulder 72 of the interposer 66 is moved to the right in FIG. 4, closing the contacts 76 as noted above. At this time, the leader is in a position as shown in FIG. 1, and the loop 39 at the free end of the tape becomes coupled to the hook 38 at the extended end of the leader as the tape reel slips onto the hub 15. In this position, roller 86 on arm 80 is resting upon the surface of the leader and holds contacts 90 closed.

Figure 10:
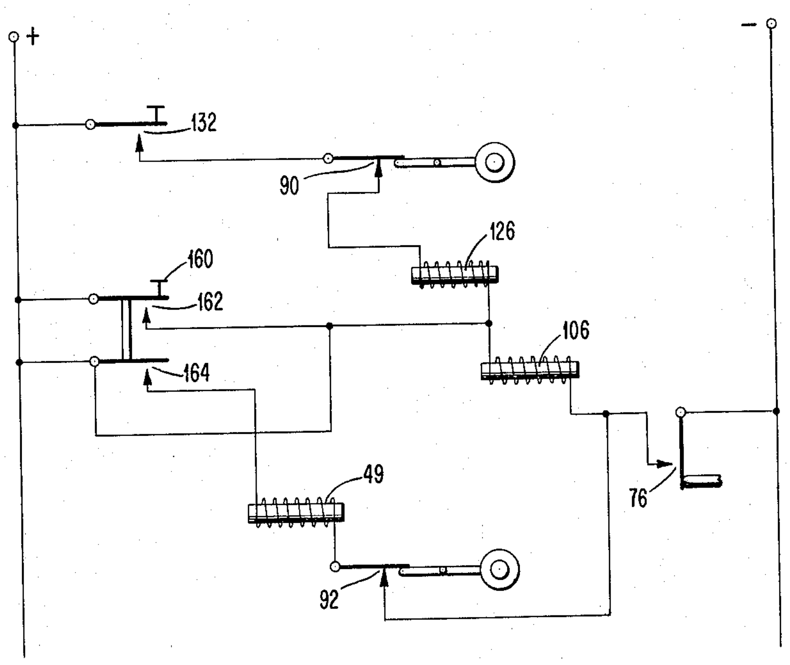
FIG. 10 is a schematic diagram of an electrical circuit for the control of the tape handling mechanism shown in FIG. 1.

Referring to FIG. 10, it may be seen that the closing of the "load" contacts 132 completes the circuit from a positive line through the load contacts 132, contacts 90, magnet 126, solenoid 106 and contacts 76 to a ground line. Magnet 126, thus energized, swings hook-arm 128 in a clockwse direction about pivot 130. Energization of solenoid 106 releases the brake pin 116 from the ratchet wheel 118 and also allows spring clutch 104 to be engaged, as described above, to impart a counterclockwise rotative force from shaft 102 to shaft 100, said rotative force being greater than the constant low torque T applied to shaft 14. Sprocket wheel 12 is thereby rotated in a counterclockwise direction about pivot 130. Energization of sole-FIG. 1. As the leader is driven to the left it threads the tape through the stations of the machine until such time as the roller 86 of arm 80 drops into slot 95 of the leader. The leader thus indicates that the threading operation has been completed and the contacts 90 normally closed—due to the fact that the roller rode on the surface of the leader—are now allowed to open. The opening of contacts 90 causes solenoid 106 to become de-energized, causing clutch lever 108 to disengage the spring clutch 104 and apply the brake pin 116 to the ratchet wheel 118. Sprocket wheel 12, which was being driven by shaft 100, thereupon ceases to rotate. When the sprocket wheel 12 is braked, the constant low torque T applied to the shaft 14 again holds the tape 7 is a restrained fashion and prevents "festooning" of both the leader and the tape.

The tape is now in a position to permit the reading of information therefrom. A drive means, not shown, may now be employed to draw the tape through the channel member 10 and into a bin, not shown. The entire threading operation has thus been completed without the use of a take-up reel. The tape and the leader have been held taut and the time consuming operation of threading a tape onto a now unnecessary take-up reel has been eliminated.

Assuming that the tape has been processed and is located in the bin, it becomes desirable—again, in the interest of saving time—to rapidly rewind the tape onto the reel.

With the tape in a position to be rewound, roller 86 on arm 82 rides on the surface of the tape and causes contacts 92 to remain closed (FIG. 1). To obtain a high speed rewind of the tape onto the reel, an unload button 160 (FIG. 10) is operated to close the contacts 162 and 164. This completes a circuit from a positive line through the contacts 162, the solenoid 106 and the contacts 76 to a ground line, thereby energizing solenoid 106 which causes the clutch lever 108 (FIG. 6) to disengage brake pin 116 from the ratchet wheel 118. The magnet 126 is at this time de-energized because contacts 90 are open, thereby preventing engagement of the spring clutch 104 and rendering sprocket wheel 12 free wheeling. As shown in FIG. 10, the closing of the contacts 164 completes the circuit from the positive line through the solenoid 49, the contacts 92 and the contacts 76 to the ground line. The solenoid 40, thus energized, allows detent 47 (FIG. 9) to disengage from the ring 45, thereby providing a high torque by the two-torque spring clutch to be applied to shaft 14 and the tape to be rewound onto the reel at a high rate of speed. The high torque on shaft 14 rewinds the tape on to the reel until such time as the leader itself again coacts with the control means when the roller 86 on the arm 82 drops into the slot 94 of the leader and causes the contacts 92 to open. The opening of the contacts 92 de-energizes the circuit to the solenoid 40, the detent 47 thereby engages the ring 45, causing the high torque to be removed from the shaft 14.

The cartridge 16 may now be removed from the hub. When the tape is removed from the drive spindle, the holding means engages the spindle to prevent rotation against the low torque that remains after the rewinding operation. Also, as described above, upon removal of the tape from the spindle the contacts 76 open to prevent undesired operation of the control circuit and the securing means again engages the leader, securing it in a position whereby subsequent similar operations may be performed.

While the invention has been particularly shown and described with reference to a preferred embodiment thereof, it will be understood by those skilled in the art that various changes in form and details may be made therein without departing from the spirit and scope of the invention.

We claim:

1. In combination with a tape handling mechanism of the type in which a tape to be threaded is supplied from a supply station and passes in a forward direction thru guide means of said tape handling mechanism to a forward drive station:

a flexible elongated leader having an extended position, and a retracted position, said extended position being that in which said leader extends from said forward driving station thru said guide means to said supply station, the end of said leader nearest said supply station being its extended end;

means at said supply station to hold a tape to be threaded;

separable coupling means to couple said extended end of said leader with one end of said tape to be threaded, when said leader is in said extended position;

forward drive means at said forward driving station for drawing said leader from said extended position into said retracted position, to thereby draw said tape in said forward direction thru said guide means;

rewind drive means for pulling said tape in a reverse direction thru said guide means, to thereby tow said leader into said extended position;

and control means for selectively controlling the operation of said drive means; including means to sense the position of the leader, means controlled by said sensing means to stop said forward drive means when the tape has been threaded thru said guide means by said leader and said forward drive means, and means controlled by said sensing means to stop said rewind drive means when said leader has been returned to said extended position by said rewind drive means.

2. In combination with a tape handling mechanism of the type in which a tape to be threaded is supplied from a supply station and passes in a forward direction thru guide means of said tape handling mechanism to a forward driving station:

forward drive means at said forward driving station;

a flexible elongated leader having an extended position, and a retracted position, said extended position being that in which said leader extends from engagement with said forward drive means at said forward driving station thru said guide means to said supply station, the end of said leader nearest said supply station being its extended end;

means to hold a tape to be threaded;

means at said supply station to receive said holding means, said holding means being adapted to be mounted on said receiving means;

separable coupling means to couple said extended end of said leader with one end of said tape to be threaded, when said leader is in said extended position;

said forward drive means being adapted to draw said leader from said extended position into said retracted position, to thereby draw said tape in said forward direction thru said guide means;

restraining means tending to pull said tape towards said holding means, said restraining means thereby acting against the force of said forward drive means to hold said tape and said leader taut;

rewind drive means for pulling said tape in a reverse direction thru said guide means, to thereby tow said leader into said extended position;

means for selectively controlling the operation of said drive means;

and means to stop said reverse drive means when said leader has been returned to said extended position by said reverse drive means.

3. In combination with a tape handling mechanism of the type in which a tape to be threaded is supplied from a supply station and passes in a forward direction thru guide means of said tape handling mechanism to a forward drive station:

a flexible elongated leader having an extended position, and a retracted position, said extended position being that in which said leader extends from said forward driving station thru said guide means to said supply station, the end of said leader nearest said supply station being its extended end;

a cartridge, a reel upon which a tape to be threaded is coiled, said reel being rotatably mounted in said cartridge, said cartridge having an opening thru which the outer, free end of said tape extends;

a rotatable hub at said supply station to hold said cartridge, reel, and tape, said reel being separably attachable to said hub so that said reel rotates with said hub when so attached;

separable coupling means to couple said extended end of said leader with said free end of said tape to be threaded, when said leader is in said extended position;

forward drive means at said forward driving station for drawing said leader from said extended position into said retracted position, to thereby draw said tape in said forward direction thru said guide means, said hub being rotated in a forward direction thereby;

restraining means tending to rotate said hub in a reverse direction, thereby producing a force on said tape and said leader opposite in direction to that exerted by said forward drive means, whereby said tape and said leader are kept taut;

rewind drive means for pulling said tape in a reverse direction thru said guide means, to thereby tow said leader into said extended position;

means for selectively controlling the operation of said drive means;

and means to stop said reverse drive means when said leader has been returned to said extended position by said reverse drive means.

4. In combination with a tape handling mechanism of the type in which a tape to be threaded is supplied from a supply station and passes in a forward direction thru guide means of said tape handling mechanism to a forward driving station:

forward drive means at said forward driving station;

a flexible elongated leader having an extended position, and a retracted position, said extended position being that in which said leader extends from engagement with said forward drive means at said forward driving station, thru said guide means to said supply station, the end of said leader nearest said supply station being its extended end;

means to secure said extended end of said leader, said leader being held taut between said forward drive means and said securing means;

means to hold a tape to be threaded;

means at said supply station to receive said holding means, said holding means being adapted to be mounted on said receiving means;

separable coupling means, effective as said holding means is mounted on said receiving means, to couple one end of said tape to be threaded to the extended end of said leader, when said leader is in said extended position;

means operable by said tape holding means as it is mounted on said receiving means for removing said securing means;

said forward drive means being adapted to draw said leader from said extended position into said retracted position, to thereby draw said tape in a forward direction thru said guide means;

restraining means tending to pull said tape towards said holding means, said restraining means thereby acting against the force of said forward drive means to keep said tape and said leader taut;

rewind drive means for pulling said tape in a reverse direction thru said guide means to thereby tow said leader into said extended position;

means for selectively controlling the operation of said drive means;

and means to stop said pulling means when said leader has been returned to said extended position by said reverse drive means.

5. In a combination with a tape handling mechanism of the type in which a tape to be threaded is supplied from a supply station and passes in a forward direction thru guide means of said tape handling mechanism to a forward driving station:

forward drive means at said forward driving station;

a flexible elongated leader having an extended position, and a retracted position, said extended position being that in which said leader extends from engagement with said forward drive means at said forward driving station, thru said guide means to said supply station, the end of said leader nearest said supply station being its extended end;

means to secure said extended end of said leader, said leader being held taut between said forward drive means and said securing means;

means to hold a tape to be threaded;

means at said supply station to receive said holding means, said holding means being adapted to be mounted on said receiving means;

separable coupling means, effective as said holding means is mounted on said receiving means, to couple one end of said tape to be threaded to the extended end of said leader, when said leader is in said extended position;

means operable by said tape holding means as it is mounted on said receiving means for removing said securing means;

said forward drive means being adapted to draw said leader from said extended position into said retracted position, to thereby draw said tape in said forward direction thru said guide means;

indicating means comprising indicators integral with said leader to indicate the position of said leader as it moves from one position to another;

restraining means tending to pull said tape towards said holding means, said restraining means thereby acting against the force of said forward drive means to keep said tape and said leader taut;

rewind drive means for pulling said tape in a reverse direction thru said guide means, to thereby tow said leader into said extended position;

and sensing means located along the path of said leader to sense said indicators, said sensing means including means to selectively control the operation of said drive means in accordance with the position of said leader, and further including means to stop said pulling means when said leader has been returned to said extended position.

6. In combination with a tape handling mechanism of the type in which a tape to be threaded is supplied from a supply station and passes in a forward direction thru guide means of said tape handling mechanism to a forward driving station:

forward drive means at said forward driving station;

a flexible elongated leader having an extended position, and a retracted position, said extended position being that in which said leader extends from engagement with said forward drive means at said forward driving station, thru said guide means to said supply station, the end of said leader nearest said supply being its extended end;

means to secure said extended end of said leader, said leader being held taut between said forward drive means and said securing means;

means to hold a tape to be threaded;

means at said supply station to receive said holding means, said holding means being adapted to be mounted on said receiving means;

separable coupling means, effective as said holding means is mounted on said receiving means, to couple one end of said tape to the extended end of said leader, when said leader is in said extended position;

means operable by said tape holding means as it is mounted on said receiving means for removing said securing means;

said forward drive means being adapted to draw said leader from said extended position into said retracted position, to thereby draw said tape in said forward direction thru said guide means;

restraining means tending to pull said tape towards said holding means, said restraining means thereby acting against the force of said forward drive means to keep said tape and said leader taut;

rewind drive means for pulling said tape in a reverse direction thru said guide means, to thereby tow said leader into said extended position;

indicating means comprising indicators integral with said leader to indicate the position of said leader as it moves from one position to another;

sensing means located along the path of said leader to sense said indicators and thereby the position of said leader;

and control means operated by said sensing means to control said restraining means, said control means including means to selectively control the operation of said drive means in accordance with the position of said leader, said control means further including means to stop said drive means when said leader has been returned to said extended position.

7. In combination with a tape handling mechanism of the type in which a tape to be threaded is supplied from a supply station and passes in a forward direction thru guide means of said tape handling mechanism to a forward driving station:

forward drive means at said forward driving station;

a flexible elongated leader having an extended position, and a retracted position, said extended position being that in which said leader extends from engagement with forward driving station, thru said guide means to said supply station, the end of said leader nearest said supply being its extended end;

means to secure said extended end of said leader, said leader being held taut between said forward drive means and said securing means;

a reel for holding a tape to be threaded, said tape being coiled upon said reel;

a cartridge in which said reel is rotatably mounted, said cartridge having an opening through which the outer, free end of said tape extends;

a rotatable hub at said supply station to hold said cartridge, reel, and tape, said reel being separably attachable to said hub so that said reel rotates with said hub when so attached;

separable coupling means, effective as said reel is mounted on said hub, to couple said free end of said tape to the extended end of said leader, when said leader is in said extended position;

means operable by said cartridge as it is mounted on said hub for removing said securing means;

locking means adapted to be made effective by removal of said reel from said hub, to lock said hub against rotation, and adapted to be made ineffective by mounting of said reel upon said hub;

said forward drive means being adapted to draw said leader from said extended position into said retracted position, to thereby draw said tape in said forward direction thru said guide means;

restraining means tending to coil said tape onto said reel, said restraining means thereby acting against the force of said forward drive means to keep said tape and said leader taut;

rewind drive means at said supply station for pulling said tape in a reverse direction thru said guide means, to thereby tow said leader into said extended position; and indicating means comprising indicators integral with said leader to indicate the position of said leader as it moves from one position to another;

sensing means located along the path of said leader to sense said indicators and thereby the position of said leader;

and control means operated by said sensing means to control said restraining means, said control means including means for selectively controlling the operation of said drive means in accordance with the position of said leader, said control means further including means to stop said drive means when said leader has been returned to said extended position.

8. In combination with a tape handling mechanism of the type in which a tape to be threaded is supplied from a supply station and passes in a forward direction thru guide means of said tape handling mechanism to a forward driving station:

a drive sprocket at said forward driving station;

a flexible elongated leader having an extended position, and a retracted position, said extended position being that in which said leader extends from engagement with said drive sprocket at said forward driving station, thru said guide means to said supply station, the end of said leader nearest said supply having a hook attached thereto and being its extended end, a retractable securing arm located at said supply station said securing arm being adapted to engage with said extended end of said leader to secure said extended end of said leader, said leader being held taut between said drive sprocket and said securing arm;

a reel for holding a tape to be threaded, said tape being coiled upon said reel;

a cartridge in which said reel is rotatably mounted, said cartridge having an opening through which the outer, free end of said tape extends, said free end having a loop attached thereto;

a rotatable hub at said supply station to hold said cartridge, reel, and tape, said reel being separably attachable to said hub so that said reel rotates with said hub when so attached;

said loop on said tape being adapted to couple with said hook on said leader said coupling being affected as said reel is mounted on said hub when said leader is in said extended position;

means operable by said cartridge as it is mounted on said hub for retracting said securing arm thereby removing said securing arm from engagement with said leader;

an interposer adapted to lock said hub against rotation, said interposer being made effective by removal of said reel from said hub and adapted to be made ineffective by mounting said reel upon said hub;

said drive sprocket being adapted to draw said leader from said extended position into said retracted position, to thereby draw said tape in said forward direction thru said guide means;

restraining means tending to coil said tape onto said reel, said restraining means thereby acting against the force of said drive sprocket to keep said tape and said leader taut;

rewind drive means at said supply station to pull said tape in a reverse direction thru said guide means, to thereby tow said leader into said extended position;

indicating means comprising discrete variations in the surface of said leader to indicate the position of said leader as it moves from one position to another;

sensing means located along the path of said leader to sense said surface variations and thereby the position of said leader, said sensing means including rollers adapted to ride on the surface of said leader; and control means operated by said sensing means to control said restraining means, said control means including means for selectively controlling the operation of said drive sprocket and said reverse drive means in accordance with the position of said leader, said control means further including means to stop said reverse drive means and said drive sprocket when said leader has been returned to said extended position by said reverse drive means.

References Cited in the file of this patent

UNITED STATES PATENTS

| | | |
|---|---|---|
| 2,963,940 | Raabe | Dec. 13, 1960 |
| 3,025,011 | Camras | Mar. 13, 1962 |

UNITED STATES PATENT OFFICE

CERTIFICATE OF CORRECTION

Patent No. 3,153,516 October 20, 1964

Richard M. De Loof et al.

It is hereby certified that error appears in the above numbered patent requiring correction and that the said Letters Patent should read as corrected below.

In the drawings Sheet 6, in FIG. 10, the line connecting switch contact 164 to the positive line should be deleted; column 2, line 9, for "at", first occurrence, read -- a --; column 6, line 23, for "about pivot 130. Energization of sole-" read -- and drives the leader 5 to the left in --; column 8, line 1, strike out "re-"; column 9, line 27, strike out "a", first occurrence.

Signed and sealed this 20th day of April 1965.

(SEAL)
Attest:

ERNEST W. SWIDER
Attesting Officer

EDWARD J. BRENNER
Commissioner of Patents